(12) United States Patent
Sofia

(10) Patent No.: US 10,169,114 B1
(45) Date of Patent: Jan. 1, 2019

(54) PREDICTING EXHAUSTED STORAGE FOR A BLOCKING API

(71) Applicant: INTERNATIONAL BUSINESS MACHINES CORPORATION, Armonk, NY (US)

(72) Inventor: Anthony T. Sofia, Hopewell Junction, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/696,208

(22) Filed: Sep. 6, 2017

(51) Int. Cl.
*G06F 9/54* (2006.01)

(52) U.S. Cl.
CPC .................................. *G06F 9/544* (2013.01)

(58) Field of Classification Search
None
See application file for complete search history.

(56) References Cited

U.S. PATENT DOCUMENTS

| | | | |
|---|---|---|---|
| 6,839,762 B1* | 1/2005 | Yu | A61B 5/0456 709/230 |
| 7,890,455 B2 | 2/2011 | Bourbonnais et al. | |
| 9,135,951 B2 | 9/2015 | Sierra | |
| 9,158,497 B2 | 10/2015 | Dawson et al. | |
| 9,324,365 B2 | 4/2016 | Hametner | |
| 2014/0269755 A1 | 9/2014 | Veiga | |
| 2014/0344469 A1 | 11/2014 | Nicholls | |
| 2015/0067186 A1 | 3/2015 | Kuhn | |
| 2016/0147448 A1 | 5/2016 | Schreter et al. | |
| 2016/0359762 A1* | 12/2016 | Weinig | H04L 67/16 |
| 2017/0090998 A1* | 3/2017 | Pilkington | G06F 9/544 |

FOREIGN PATENT DOCUMENTS

WO     2015034698 A1     3/2015

OTHER PUBLICATIONS

List of IBM Patents or Patent Applications Treated as Related; (Appendix P), Date Filed Nov. 1, 2017; 2 pages.
Sofia et al., "Predicting Exhausted Storage for a Blocking API"; U.S. Appl. No. 15/800,115, filed Nov. 1, 2017.

\* cited by examiner

*Primary Examiner* — Craig C Dorais
(74) *Attorney, Agent, or Firm* — Cantor Colburn LLP; William A. Kinnaman, Jr.

(57) ABSTRACT

Embodiments include methods, systems and computer program products for operating a blocking application program interface (API). Aspects include receiving, from a requestor, a request for a data from an application and creating, by the blocking API of the application, a buffer for the data. Aspects also include receiving, by the application, a data record corresponding to the request and storing, by the blocking API, the data record in the buffer. Aspects further include based on a determination that the buffer is full, providing, by the blocking API, the data records in the buffer to the requestor.

13 Claims, 4 Drawing Sheets

PREDICTING EXHAUSTED STORAGE FOR A BLOCKING API

BACKGROUND

The present disclosure relates to the field of blocking application program interfaces (APIs), and more specifically, to predicting exhausted storage for a blocking API.

A blocking API is an API that provides multiple records back to a requestor in a blocked format. Blocking APIs are configured to collect records in a buffer and to provide the records to a requestor once the buffer is filled. For example, records could be generated once per second and the API can utilize a buffer that would support holding ten records. Blocking APIs provide performance benefits by reducing the per record overhead associated with providing the records to the requestor.

In the event that the records are produced at a sporadic rate and there is a timely-ness requirement for the data to be made available to the requestor, traditional blocking APIs can cause additional latency. For example, a problem arises when the buffer is close to full and another record is not immediately available. In this case, traditional blocking APIs will wait until the next record is made available before providing the records to the requestor. Only once the next record has been received by the blocking API, can it be determined if the record will fit into the buffer. If the record will not fit into the buffer then data in the buffer is provided to the requestor, without this newly available record. This additional latency is then added to those records being available to the requestor.

SUMMARY

In accordance with one embodiment, a computer-implemented method for operating a blocking application program interface (API) is provided. The method includes receiving, from a requestor, a request for a data from an application and creating, by the blocking API of the application, a buffer for the data. The method also includes receiving, by the application, a data record corresponding to the request and storing, by the blocking API, the data record in the buffer. The method further includes based on a determination that the buffer is full, providing, by the blocking API, the data records in the buffer to the requestor;

In accordance with another embodiment, a system for operating a blocking application program interface (API) is provided. The system includes at least one processor and a memory, operably coupled to the at least one processor, the memory storing processor computer readable instructions. The at least one processor is configured to execute computer readable instructions, which cause the processor to receive, from a requestor, a request for a data from an application and create, by the blocking API of the application, a buffer for the data. The computer readable instructions also cause the processor to receive, by the application, a data record corresponding to the request and store, by the blocking API, the data record in the buffer. Based on a determination that the buffer is full, the computer readable instructions also cause the processor to provide, by the blocking API, the data records in the buffer to the requestor. Based on a determination that the buffer is not full, the computer readable instructions further cause the processor to determine by the blocking API, based at least in part on an amount of available storage in the buffer, whether to provide the data records in the buffer to the requestor or to wait for another data record before providing the data records in the buffer to the requestor.

In accordance with another embodiment, a computer program product, the computer program product comprising a computer readable storage medium having program instructions embodied therewith, the program instructions executable by a processor to cause the processor to receive, from a user, a request for the ride share, the request comprising request data that includes a pickup location, a drop off location and a proposed fare contribution. The program instructions also cause the processor to receive, from a requestor, a request for a data from an application and create, by the blocking API of the application, a buffer for the data. The computer readable instructions also cause the processor to receive, by the application, a data record corresponding to the request and store, by the blocking API, the data record in the buffer. Based on a determination that the buffer is full, the computer readable instructions also cause the processor to provide, by the blocking API, the data records in the buffer to the requestor. Based on a determination that the buffer is not full, the computer readable instructions further cause the processor to determine by the blocking API, based at least in part on an amount of available storage in the buffer, whether to provide the data records in the buffer to the requestor or to wait for another data record before providing the data records in the buffer to the requestor.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Embodiments of the present disclosure include systems, computer program products, and methods for operating a blocking application program interface (API). In exemplary embodiments, the methods include predicting exhausted storage for a blocking API to determine when to provide accumulated data to a requestor. In exemplary embodiments, a blocking API is configured to use statistical measurements to avoid adding latency to data being provided to a requestor by predicting if the next record will fit in the remainder of a buffer. In the event the prediction is that the next record will not fit in the buffer then the data in the buffer is provided to the requestor without the additional latency of waiting for the next record to determine if it fits in the buffer. In exemplary embodiments, the statistical measurements can include, but are not limited to, the mean, median, mode and standard deviation of the size and the arrival time of the data records received by the application.

Figure 1:
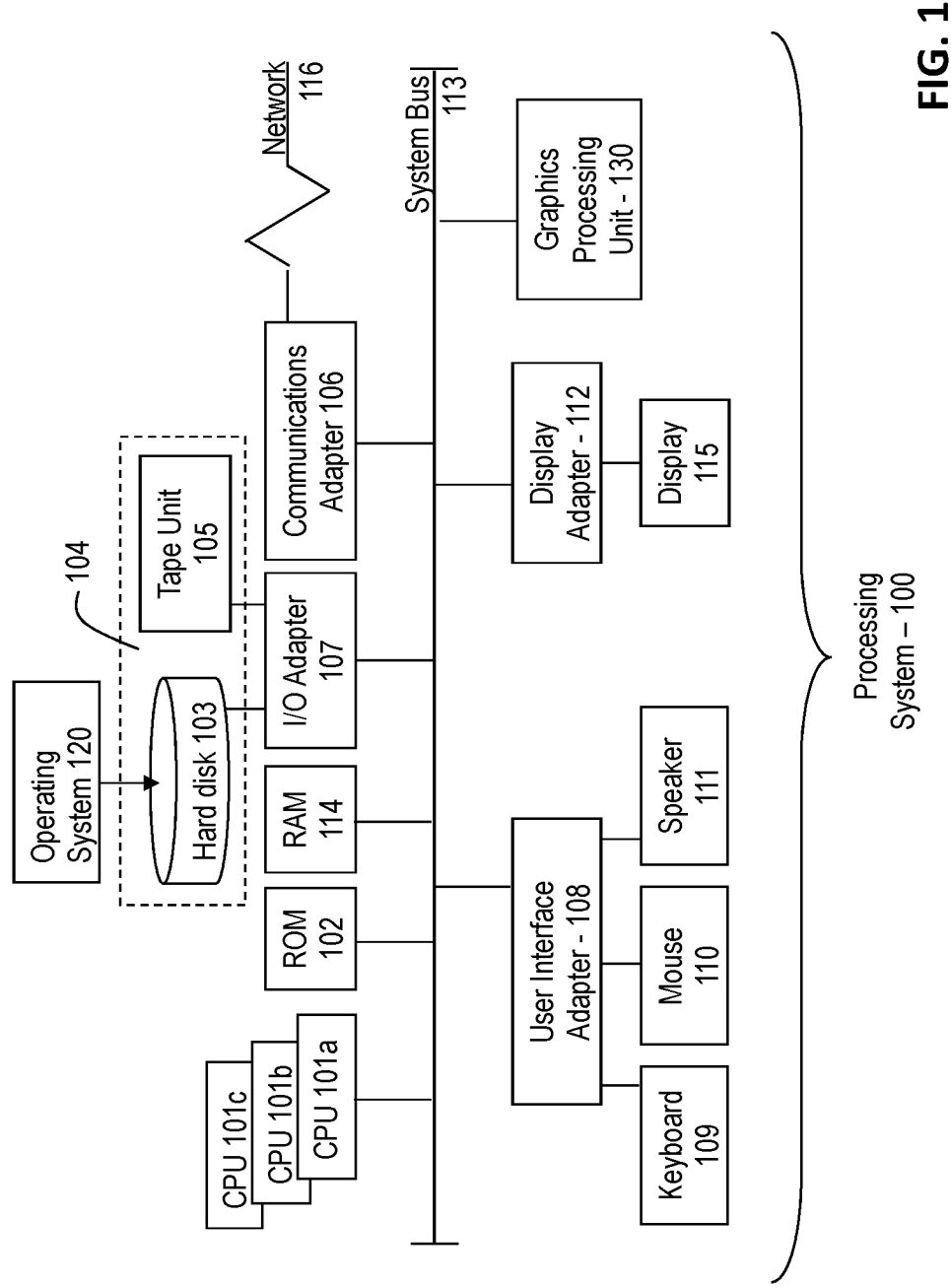
FIG. 1 illustrates an example of a computer system in accordance with one or more embodiments of the present invention.

FIG. 1 illustrates an example of a computer system in accordance with one or more embodiments of the present invention. As shown, a processing system 100 one or more central processing units (processors) 101a, 101b, 101c, etc. (collectively or generically referred to as processor(s) 101). In one or more embodiments, each processor 101 may include a reduced instruction set computer (RISC) microprocessor. Processors 101 are operably coupled to various components of system 100 via system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with network 116 enabling system 100 to communicate with other (internal or external) systems (not depicted).

Referring again to FIG. 1, a screen (e.g., a display monitor) 115 is connected to system bus 113 by display adaptor 112, which may include a graphics adapter to improve the performance of graphics intensive applications and a video controller. In one or more embodiments, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters, which may include protocols, such as the Peripheral Component Interconnect (PCI) protocol. Additional exemplary input/output devices are shown as connected to system bus 113 via user interface adapter 108 and display adapter 112. In one or more embodiments, keyboard 109, mouse 110, and speaker 111 are all interconnected to bus 113 via user interface adapter 108, which may be embodied (by way of example only) as multiple device adapters (not depicted) or may combine one or more device adapters into a single integrated circuit (sometimes referred to as a super I/O chip).

Thus, as illustrated in FIG. 1, processing system 100 includes: processing capability in the form of processors 101; memory in the form of ROM 102, RAM 114 (sometimes referred to as system memory) and mass storage 104; input means in the form of keyboard 109 and mouse 110; and output capability in the form of speaker 111 and display 115. In one or more embodiments, a portion of system memory 114 and mass storage 104 collectively store an operating system, whose functions can include coordination of various system components. The memory can also store one or more applications, that when executed by the processor 101, perform one or more methods of the present invention.

Figure 2:
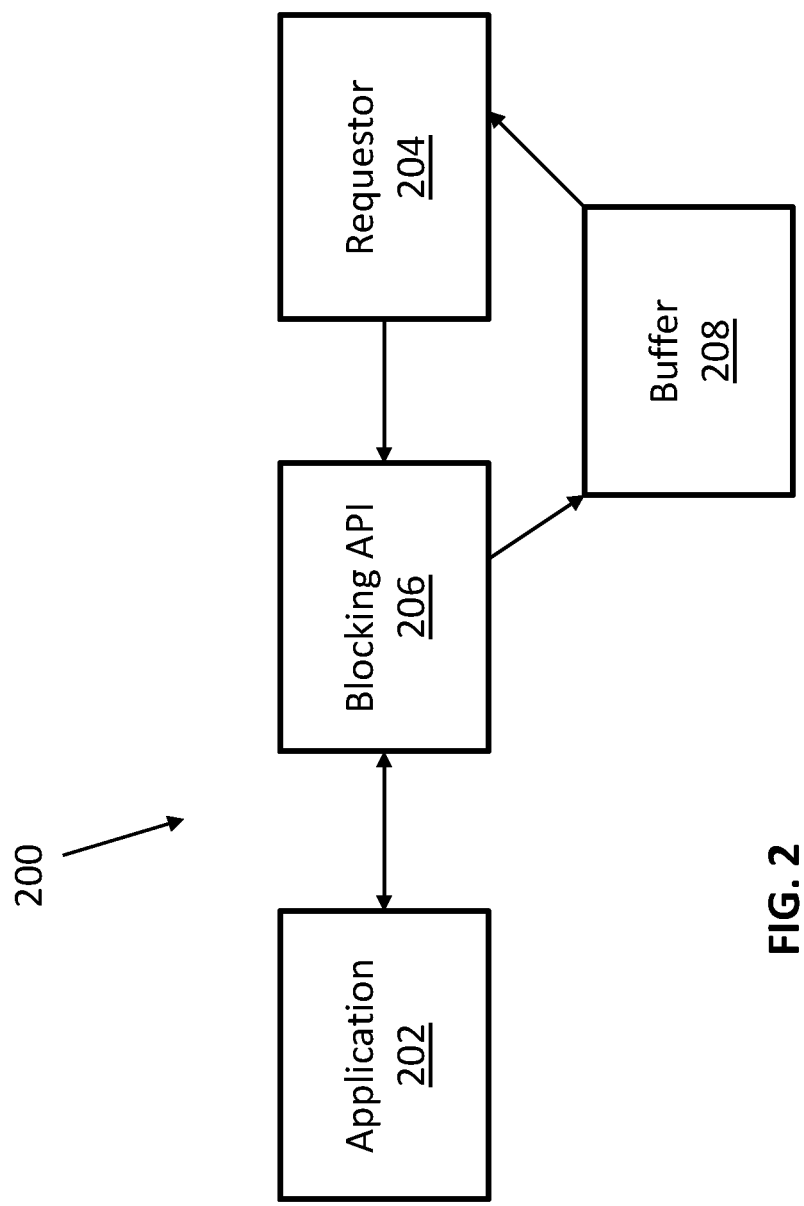
FIG. 2 illustrates an exemplary system in accordance with one or more embodiments of the present invention.

Referring to FIG. 2, a system 200 in accordance with one or more embodiments of the present invention. As depicted, the system 200 includes an application 202 in communication with a requestor 204 via a blocking API. In one embodiment, the requestor 204 can be an application that is disposed on the same processing system, such as the one shown in FIG. 1, as the application 202. In another embodiment, the requestor 204 can be an application that is disposed on another processing system that is in communication with the processing system that hosts the application 202. The system 200 includes a buffer 208 that is created by the requestor and provided to the blocking API 206. The buffer 208 is configured to store data records that are received by the blocking API 206 from the application 202 before the data records are provided to the requestor 204. In exemplary embodiments, the buffer 208 has a fixed size that is set by the blocking API 206. The blocking API 206 may determine the size of the buffer 208 based on one or more characteristics of the data request received from the requestor 204 and/or the communication characteristics (i.e., communication latency and overhead of communications protocol) between the buffer 208 and the requestor 204.

In exemplary embodiments, the blocking API 206 provides multiple data records to the requestor in a single call from the buffer 208. At a given time the request is received, the application may not have enough data records available to completely fill the buffer 208. In that case, the blocking API 206 will wait for records to become available to fill the buffer 208. In the event that a newly received record that triggers the blocking API 260 to wake up does not fit into the buffer 208, there is additional latency added to the records that were waiting in the buffer 208. In order to avoid this added latency, the blocking API 206 is configured to utilize the methods described herein, such as those shown in FIGS. 3 and 4, to determine when to provide the data records in the buffer 208 to the requestor 204.

Figure 3:
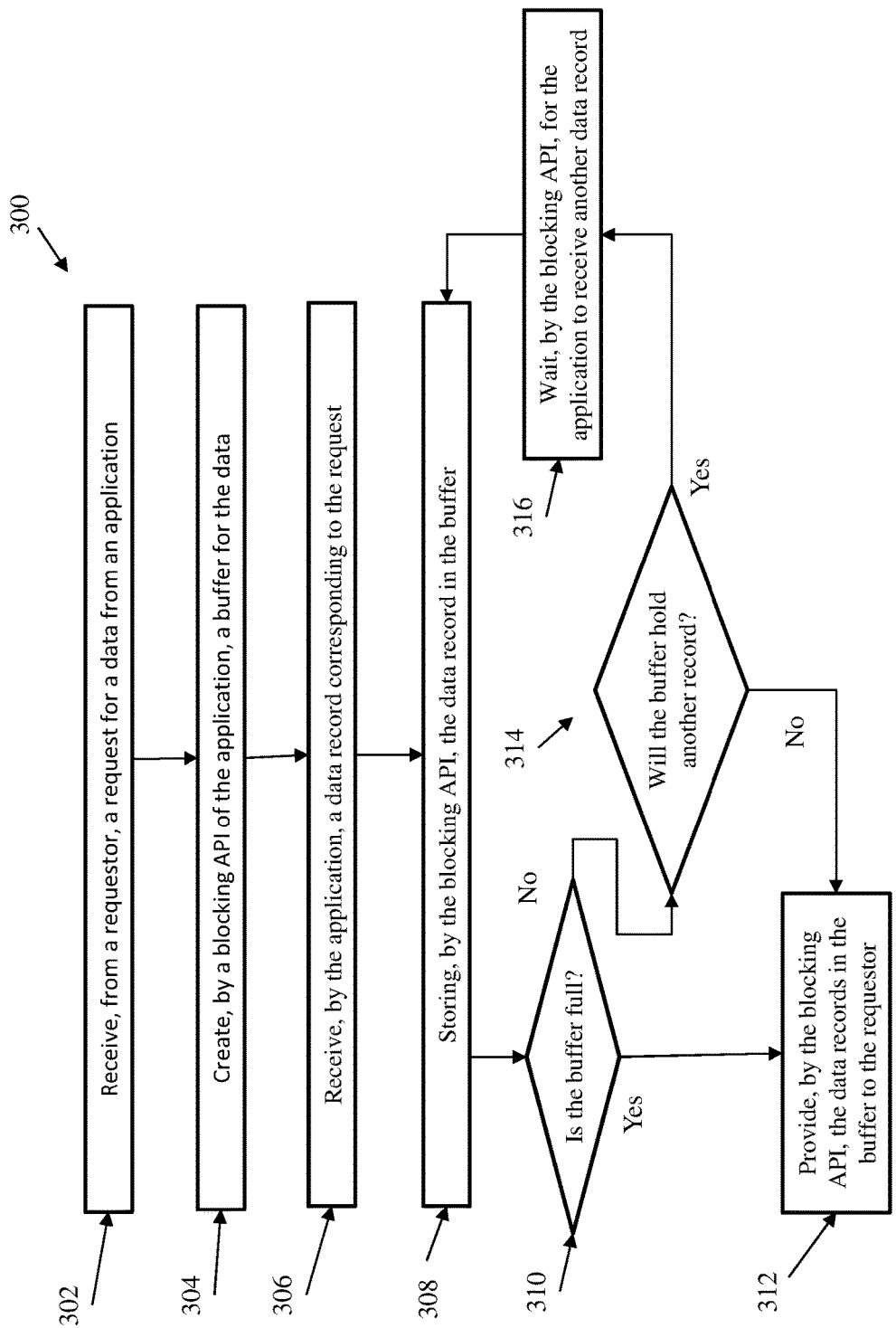
FIG. 3 illustrates an example of a method in accordance with one or more embodiments of the present invention.

Referring to FIG. 3, a flowchart of a method 300 for operating a blocking application program interface (API) in accordance with one or more embodiments of the present invention. As illustrated, at block 302, the method 300 includes receiving, from a requestor, a request for a data from an application. Next, as shown at block 304, the method 300 includes creating, by the blocking API of the application, a buffer for the data. As shown at block 306, the method 300 includes receiving, by the application, a data record corresponding to the request. Next, as shown at block 308, the method 300 includes storing, by the blocking API, the data record in the buffer.

Continuing with reference to FIG. 3, as shown at decision block 310, the method 300 includes determining if the buffer is full. If the buffer is full, the method 300 proceeds to block 312 and provides the data records in the buffer to the requestor. Otherwise, the method 300 proceeds to decision block 314 and determines if the buffer will hold another record. In exemplary embodiments, the determination of whether the buffer will hold another record is made by determining if the available space in the buffer is greater than an average record size, i.e., a mean, median, or mode size of a predetermined number of the last data records received. In one embodiment, the determination of whether the buffer will hold another record includes determining if remaining space is the buffer is large enough to hold a record size that is one or two standard deviations larger than the average record size.

The average record size and the statistics related thereto can be based on the information that is either capture at a per-request level or at an overall level. In exemplary embodiments, the blocking API is configured to maintain a running average, a minimize size, a maximum size and a standard deviation of the sizes of records that have been provided to the requestor. This data can be collected and analyzed either for the records inside of the current buffer or for all records that have ever been provided to the requestor. In the latter case, this information can be saved across multiple requests by the blocking API.

Based on a determination that the buffer will not hold another record, the method 300 proceeds to block 312 and provides the data records in the buffer to the requestor. Otherwise, the method 300 proceeds to block 316 and waits for the application to receive another data record. By returning the data records in the buffer when the buffer will not hold another record without waiting for the next record to be received, the latency for the records that are currently in the buffer is reduced.

Figure 4:
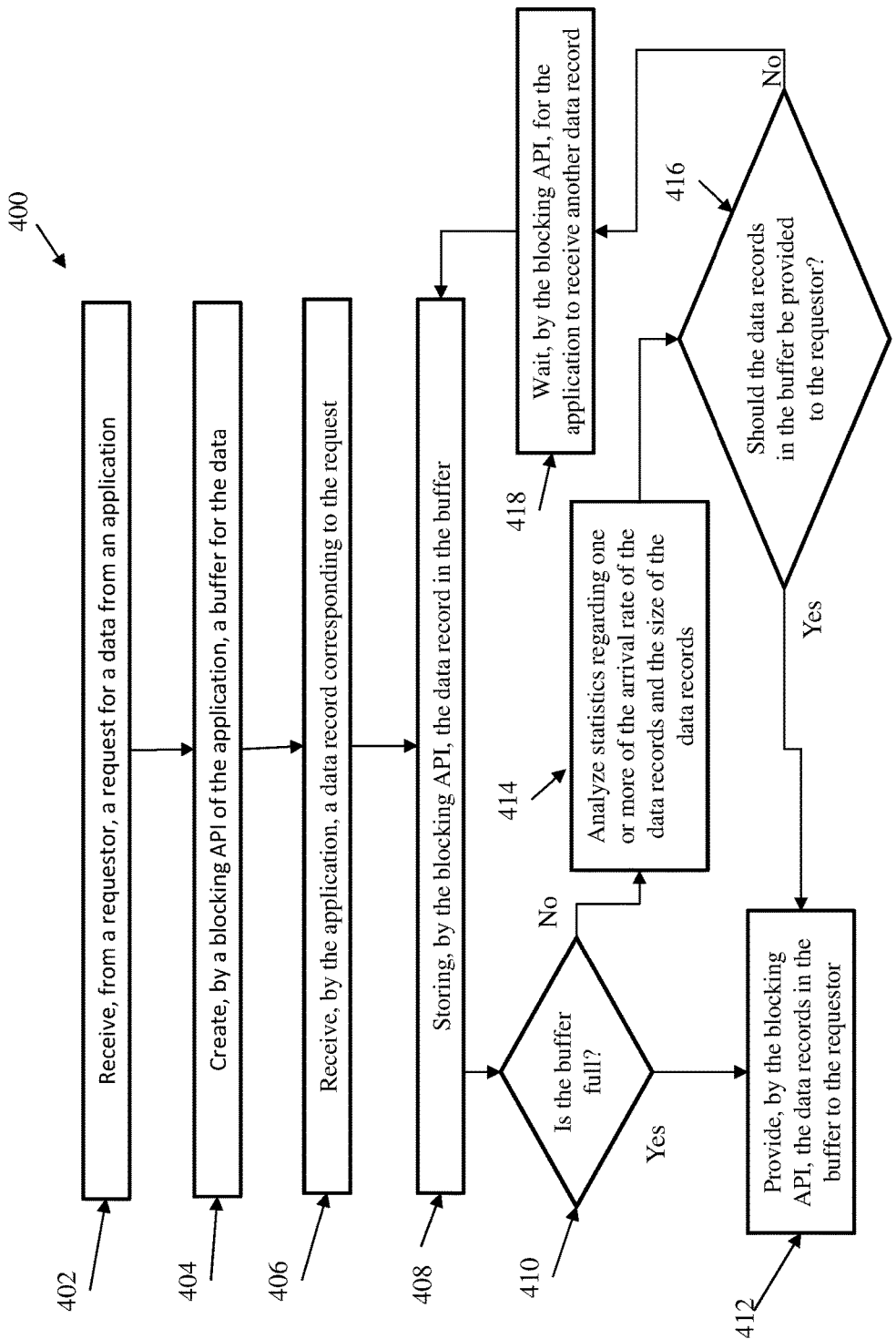
FIG. 4 illustrates another exemplary method in accordance with one or more embodiments of the present invention.

Referring to FIG. 4, a flowchart of a method 400 for operating a blocking application program interface (API) in accordance with one or more embodiments of the present invention. As illustrated, at block 402, the method 400 includes receiving, from a requestor, a request for a data from an application. Next, as shown at block 404, the method 400 includes creating, by the blocking API of the application, a buffer for the data. As shown at block 406, the method 400 includes receiving, by the application, a data record corresponding to the request. Next, as shown at block 408, the method 400 includes storing, by the blocking API, the data record in the buffer.

Continuing with reference to FIG. 4, as shown at decision block 410, the method 300 includes determining if the buffer is full. If the buffer is full, the method 400 proceeds to block 412 and provides the data records in the buffer to the requestor. Otherwise, the method 400 proceeds to block 414 and analyzes statistics regarding one or more of the arrival rate of the data records and the size of the data records. In exemplary embodiments, the statistics can include, but are not limited to, a mean data record size, a median data record size, a mode data record size, a standard deviation of the data record size, a mean arrival rate, and a standard deviation of the arrival rate. Next, as shown at decision block 416, the method 400 includes determining if the data records in the buffer should be provided to the requestor without waiting for another data record. If the determination is made to provide the data records in the buffer, the method 400 proceeds to block 412 and provides the data records in the buffer to the requestor. Otherwise, the method 400 proceeds to block 418 and waits for the application to receive another data record. After another data record is received, the method 400 returns to block 408 and stores the newly received data record in the buffer.

In one embodiment, the determination of whether to provide the data records in the buffer to the requestor or to wait for another data record before providing the data records is based on an average size of the last number of data records received by the application and the amount of available storage in the buffer. In one embodiment, the determination to provide the data records in the buffer to the requestor is made based on determining that the average size of the last number of data records received by the application is greater than the amount of available storage in the buffer. For example, if a buffer has one hundred kilobytes of available storage and the average size of the last ten data records is two-hundred kilobytes, the data in the buffer will be provided without waiting on another data record. In one embodiment, the determination to wait for another data record before providing the data records is made based on determining that the average size of the last number of data records received by the application is less than the amount of available storage in the buffer. For example, if a buffer has one hundred kilobytes of available storage and the average size of the last ten data records is fifty kilobytes, the blocking API will wait for another data record before providing the data records.

In one embodiment, the determination of whether to provide the data records in the buffer to the requestor or to wait for another data record before providing the data records is based on an average size of the last number of data records received by the application, the amount of available storage in the buffer, and an arrival rate of data records received by the application. The determination to provide the data records in the buffer to the requestor is made based on determining that the average size of the last number of data records received by the application is greater than the amount of available storage in the buffer or that the expected time until the next record will be received is greater than a threshold amount of time. For example, if a buffer has one hundred kilobytes of available storage and the average size of the last ten data records is fifty kilobytes but the expected time until the next record will be received is one second and the threshold provided is fifty milliseconds, the data in the buffer will be provided without waiting on another data record. The determination to wait for another data record before providing the data records is made based on determining that the average size of the last number of data records received by the application is less than the amount of available storage in the buffer and that the expected time until the next record will be received is less than a threshold amount of time. For example, if a buffer has one hundred kilobytes of available storage and the average size of the last ten data records is fifty kilobytes but the expected time until the next record will be received is ten milliseconds and the threshold provided is fifty milliseconds, the blocking API will wait for another data record before providing the data records.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically identified device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, micro-identifier, firmware instructions, state-setting data, or either source identifier or object identifier written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), a wireless LAN (WLAN using WiFi), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A system for operating a blocking application program interface (API) of an application, the system comprising:
   at least one processor and a memory, operably coupled to the at least one processor, the memory storing processor computer readable instructions;
   the at least one processor, configured to execute computer readable instructions, which cause the processor to:
   receive, from a requestor, a request for data from the application;
   create, by the blocking API of the application, a buffer for the data;
   receive, by the application, a data record corresponding to the request;
   store, by the blocking API, the data record in the buffer;
   based on a determination that the buffer is full, provide, by the blocking API, data records in the buffer to the requestor; and
   based on a determination that the buffer is not full, determine by the blocking API, based at least in part on an amount of available storage in the buffer, whether to provide the data records in the buffer to the requestor or to wait for another data record before providing the data records in the buffer to the requestor.

2. The system of claim 1, wherein the determination of whether to provide the data records in the buffer to the requestor or to wait for another data record before providing the data records is further based on an average size of a last number of data records received by the application.

3. The system of claim 2, wherein the determination to provide the data records in the buffer to the requestor is made based on determining that the average size of a last number of data records received by the application is greater than the amount of available storage in the buffer.

4. The system of claim 2, wherein the determination to wait for another data record before providing the data records is made based on determining that the average size of a last number of data records received by the application is less than the amount of available storage in the buffer.

5. The system of claim 2, wherein the determination of whether to provide the data records in the buffer to the requestor or to wait for another data record before providing the data records is further based on an arrival rate of data records received by the application.

6. The system of claim 5, wherein the determination to provide the data records in the buffer to the requestor is made based on determining that the average size of a last number of data records received by the application is greater than the amount of available storage in the buffer or that an expected time until the next record will be received is greater than a threshold amount of time.

7. The system of claim 5, wherein the determination to wait for another data record before providing the data records is made based on determining that the average size of a last number of data records received by the application is less than the amount of available storage in the buffer and that an expected time until the next record will be received is less than a threshold amount of time.

8. A computer program product, the computer program product comprising a computer readable storage medium having program instructions embodied therewith, the program instructions executable by a processor to cause the processor to:
  receive, from a requestor, a request for data from an application;
  create, by a blocking API of the application, a buffer for the data;
  receive, by the application, a data record corresponding to the request;
  store, by the blocking API, the data record in the buffer;
  based on a determination that the buffer is full, provide, by the blocking API, data records in the buffer to the requestor; and
  based on a determination that the buffer is not full, determine by the blocking API, based at least in part on an amount of available storage in the buffer, whether to provide the data records in the buffer to the requestor or to wait for another data record before providing the data records in the buffer to the requestor.

9. The computer program product of claim 8, wherein the determination of whether to provide the data records in the buffer to the requestor or to wait for another data record before providing the data records is further based on an average size of a last number of data records received by the application.

10. The computer program product of claim 9, wherein the determination to provide the data records in the buffer to the requestor is made based on determining that the average size of a last number of data records received by the application is greater than the amount of available storage in the buffer.

11. The computer program product of claim 9, wherein the determination to wait for another data record before providing the data records is made based on determining that the average size of a last number of data records received by the application is less than the amount of available storage in the buffer.

12. The computer program product of claim 9, wherein the determination of whether to provide the data records in the buffer to the requestor or to wait for another data record before providing the data records is further based on an arrival rate of data records received by the application.

13. The computer program product of claim 12, wherein the determination to provide the data records in the buffer to the requestor is made based on determining that the average size of a last number of data records received by the application is greater than the amount of available storage in the buffer or that an expected time until the next record will be received is greater than a threshold amount of time.

* * * * *